US010087733B2

(12) United States Patent
Dumoit

(10) Patent No.: US 10,087,733 B2
(45) Date of Patent: Oct. 2, 2018

(54) FRACTURE MAPPING USING VERTICAL SEISMIC PROFILING WAVE DATA

(71) Applicant: Jeremy Dumoit, Richmond, TX (US)

(72) Inventor: Jeremy Dumoit, Richmond, TX (US)

(73) Assignee: BAKER HUGHES, A GE COMPANY, LLC, Houston, TX (US)

( * ) Notice: Subject to any disclaimer, the term of this patent is extended or adjusted under 35 U.S.C. 154(b) by 320 days.

(21) Appl. No.: 14/926,626

(22) Filed: Oct. 29, 2015

(65) Prior Publication Data

US 2017/0122088 A1   May 4, 2017

(51) Int. Cl.
| | |
|---|---|
| *E21B 43/26* | (2006.01) |
| *E21B 49/00* | (2006.01) |
| *G01V 1/30* | (2006.01) |
| *G01V 1/42* | (2006.01) |
| *E21B 47/14* | (2006.01) |

(52) U.S. Cl.
CPC ............. *E21B 43/26* (2013.01); *E21B 49/00* (2013.01); *G01V 1/307* (2013.01); *G01V 1/42* (2013.01); *E21B 47/14* (2013.01)

(58) Field of Classification Search
CPC ........ E21B 43/26; E21B 47/101; E21B 47/14; E21B 49/00; G01V 1/42; G01V 2210/161; G01V 2210/626; G01V 1/282; G01V 1/303; G01V 1/306; G01V 2210/646

See application file for complete search history.

(56) References Cited

U.S. PATENT DOCUMENTS

| | | | |
|---|---|---|---|
| 2008/0159075 A1* | 7/2008 | Underhill | G01V 1/42 367/50 |
| 2010/0128562 A1 | 5/2010 | Blias | |
| 2012/0057432 A1 | 3/2012 | Hill et al. | |
| 2014/0078864 A1 | 3/2014 | Freitas | |
| 2014/0083681 A1* | 3/2014 | Taylor | E21B 43/26 166/250.1 |
| 2014/0290936 A1 | 10/2014 | Wills et al. | |

(Continued)

FOREIGN PATENT DOCUMENTS

WO    2011077223 A2    6/2011

OTHER PUBLICATIONS

Cicerone; et al. "Fracture Characterization from Vertical Seismic Profiing Data"; Journal of GeoPhysical Research, vol. 100, No. B3; Mar. 1995; The American Geophysical Union; 18 pages.

(Continued)

*Primary Examiner* — Daniel P Stephenson
(74) *Attorney, Agent, or Firm* — Cantor Colburn LLP

(57) ABSTRACT

A method for performing a hydrocarbon production action on an earth formation includes: obtaining a first vertical seismic profile (VSP) of the earth formation before a stimulation treatment is applied to the earth formation, the first VSP having first seismic data of a seismic property of received first seismic waves, and obtaining a second VSP of the earth formation after the stimulation treatment is applied to the earth formation, the second VSP comprising second seismic data of the seismic property of received second seismic waves. The method further includes quantifying a difference between the second seismic data and the first seismic data and performing the hydrocarbon production action using the quantified difference.

14 Claims, 3 Drawing Sheets

(56) References Cited

U.S. PATENT DOCUMENTS

| | | | |
|---|---|---|---|
| 2015/0073715 A1* | 3/2015 | Aarre | G01V 1/003 |
| | | | 702/14 |
| 2017/0031048 A1* | 2/2017 | Hilpert | E21B 49/00 |
| 2017/0122088 A1* | 5/2017 | Dumoit | E21B 43/26 |
| 2017/0192118 A1* | 7/2017 | Du | G01V 1/50 |
| 2017/0212260 A1* | 7/2017 | Padhi | G01V 1/305 |
| 2017/0235006 A1* | 8/2017 | Ellmauthaler | G01V 1/42 |
| | | | 702/6 |
| 2017/0285195 A1* | 10/2017 | Pei | G01V 1/303 |

OTHER PUBLICATIONS

Notification of Transmittal of the International Search Report and the Written Opinion of the International Searching Authority, or the Declaration; PCT/US2016/057064; dated Jan. 24, 2017, 13 pages.

\* cited by examiner

FRACTURE MAPPING USING VERTICAL SEISMIC PROFILING WAVE DATA

BACKGROUND

Hydraulic fracturing is commonly used to fracture tight earth formations such as shale in order to extract hydrocarbons such as oil or gas. The fracturing results in a distribution of many fractures and micro-fractures of formation rock. These fractures once opened increase the flow of hydrocarbons to make their extraction feasible. By knowing the distribution of the fractures and micro-fractures, petro-analysts and well engineers can formulate plans to economically extract the hydrocarbons. These plans may include selecting equipment and equipment operating parameters for example. Hence, more accurate knowledge of the distribution of fractures and micro-fractures would be well received in the hydrocarbon production industries.

BRIEF SUMMARY

Disclosed is a method for performing a hydrocarbon production action on an earth formation includes: obtaining, using a processor, a first vertical seismic profile (VSP) of the earth formation before a stimulation treatment is applied to the earth formation, the first VSP comprising first seismic data of a seismic property of received first seismic waves; obtaining, using the processor, a second VSP of the earth formation after the stimulation treatment is applied to the earth formation, the second VSP comprising second seismic data of the seismic property of received second seismic waves; quantifying a difference between the second seismic data and the first seismic data using the processor; and performing the hydrocarbon production action using the quantified difference.

Also disclosed is an apparatus for performing a hydrocarbon production action on an earth formation. The apparatus includes: a stimulation treatment system; a seismic source configured to emit first seismic waves before a stimulation treatment is applied to the earth formation by the stimulation treatment system and second seismic waves after the stimulation treatment is applied to the earth formation by the stimulation treatment system; an array of seismic receivers configured to receive (i) first seismic waves that provide a first vertical seismic profile (VSP) of the earth formation before the stimulation treatment is applied to the earth formation, the first VSP comprising first seismic data of a seismic property of the received first seismic waves and (ii) second seismic waves that provide a second VSP of the earth formation after the stimulation treatment is applied to the earth formation, the second VSP comprising second seismic data of the seismic property of the received second seismic waves; a processor; and a hydrocarbon production apparatus configured to perform the hydrocarbon production action using the quantified difference. The processor is configured to: obtain the first vertical seismic profile (VSP) of the earth formation before a stimulation treatment is applied to the earth formation; obtain the second VSP of the earth formation after the stimulation treatment is applied to the earth formation; and quantify a difference between the second seismic data and the first seismic data.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method presented herein by way of exemplification and not limitation with reference to the figures.

Disclosed is a method for performing a hydrocarbon production action on an earth formation. The method includes obtaining a vertical seismic profile (VSP) both before and after stimulation treatment, such as hydraulic fracturing, is applied to the earth formation. The VSPs may include measurements of one more formation properties that are related to seismic wave amplitude, velocity and/or anisotropy. Differences between the VSPs are quantified and the hydrocarbon production action is performed based on the quantified differences. A non-limiting example of the hydrocarbon production action is determining an effectiveness of the stimulation treatment and changing a stimulation parameter based on the determined effectiveness of the previous stimulation treatment. Other actions for producing hydrocarbons, such as determining an operating parameter of production equipment, may also be performed based the quantified differences.

Figure 1:
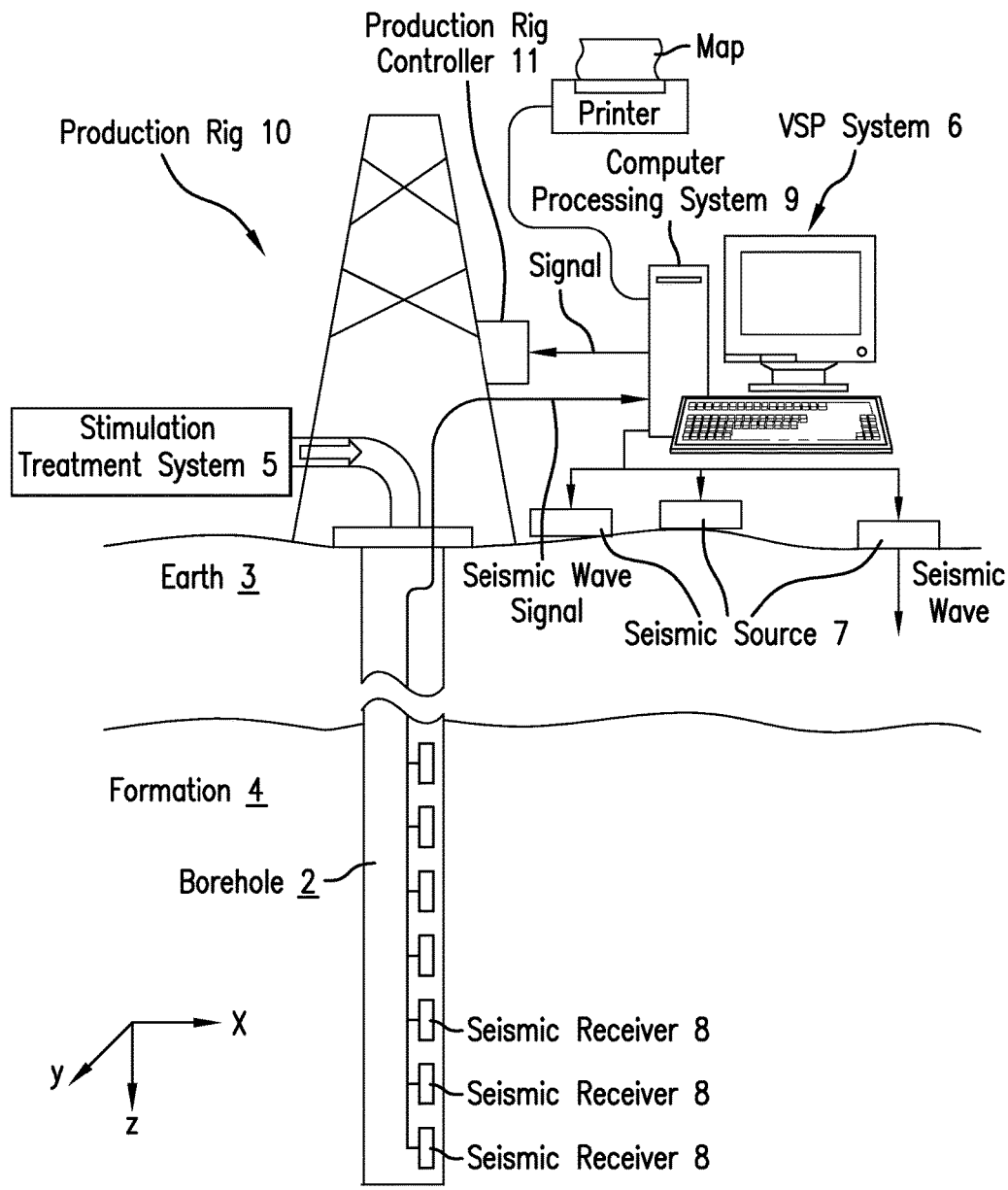
FIG. 1 is a cross-sectional view of a production rig and a vertical seismic profiling (VSP) system having sensors disposed in a borehole penetrating the earth.

Apparatus for implementing the disclosure herein is now discussed. FIG. 1 is a cross-sectional view of a borehole 2 penetrating the earth 3 having a formation layer 4. The formation layer 4 represents any formation feature of interest such as a hydrocarbon reservoir, water, or salt dome as non-limiting examples. A production rig 10 is configured perform completion and production actions relating to extracting hydrocarbons from the formation 4. The production rig 10 includes a production rig controller 11 configured to control various operations performed by the production rig. The production rig controller 11 is further configured to receive a signal providing the controller 11 with instructions, such as a set point for example, for controlling the various operations. A stimulation treatment system 5 is coupled to the borehole 2 and configured to apply a stimulation treatment to the formation 4 to increase the permeability of reservoir rock in the formation 4. In one or more embodiments, the stimulation treatment is hydraulic fracturing and the stimulation treatment system 5 is a hydraulic fracturing system. A vertical seismic profiling (VSP) system 6 is configured to perform a seismic measurement on the formation 4. The VSP 6 includes one or more seismic sources 7 configured to generate a seismic wave that propagates through the earth 3 and formation 4. The seismic wave includes a primary (p) wave that propagates the direction of the seismic wave and a shear (s) wave whose motion is perpendicular to the direction of wave propagation. The velocity of the s-wave is generally slower than the speed of the p-wave. When a plurality of seismic sources is used, the seismic source may be disposed on the surface of the earth in a linear array or in a two-dimensional array. Alternatively, one or more seismic sources may be disposed below the surface of the earth.

The VSP system 6 further includes an array of seismic receivers 8 configured to receive seismic waves and convert energy of the received seismic waves into an electrical signal. In one or more embodiments, the each seismic receiver may be configured to receive seismic waves in three orthogonal directions or axes (x, y, z). The array of seismic receivers 8 is disposed in the borehole 2 and is arranged to receive seismic waves that propagate through the earth 3 and the formation 4 and then into the borehole 2.

A computer processing system 9 is coupled to the one or more seismic sources 7 and the array of seismic receivers 8. The computer processing system 9 is configured to operate the VSP system 6 to synchronize the operation of the one or more seismic sources 7 with the receiving of seismic waves by the array of seismic receivers 8 and to receive and process seismic measurements performed by the array of seismic receivers 8. Using the measurements performed by the array of seismic receivers 8, the computer processing system 9 is configured to determine or estimate (1) seismic wave amplitude, (2) seismic wave velocity, and/or (3) seismic wave travel direction. The computer processing system 9 is configured to produce seismic data corresponding to each seismic receiver. The seismic data for each seismic receiver includes a three-dimensional location of each seismic receiver and the corresponding seismic wave measurement value (i.e., the seismic wave amplitude, seismic wave velocity, and/or seismic wave travel direction).

The VSP system 6 is configured to perform seismic wave measurements both before a stimulation treatment by the stimulation treatment system 5 and after the stimulation treatment. In one or more embodiments, the array of seismic receivers 8 is disposed in the same location before and after the stimulation treatment. In alternative embodiments, if one or more corresponding seismic receivers are not in the same location, then measurements after the stimulation treatment can be extrapolated to the locations of the one or more seismic receivers before the stimulation treatment or, alternatively, measurements before the stimulation treatment can be extrapolated to the locations of the one or more seismic receivers after the stimulation treatment.

The VSP system 6 is further configured to quantify a difference between seismic wave measurements performed after the stimulation treatment and seismic wave measurements performed before the stimulation treatment. In one or more embodiments, the difference is quantified by subtracting an after-treatment from a similar before-treatment measurement or by subtracting a before-treatment measurement from a similar after-treatment measurement. For example, measured seismic wave amplitude after treatment may be subtracted from measured seismic wave amplitude before treatment. In that new fractures will cause changes in the propagation properties of the seismic waves through the formation, a distribution of fractures in the formation can be estimated using differences in one or more of the three types of seismic wave measurements. Since seismic wave measurements are directional, volumes containing new fractures in the formation can be identified through triangulation for example. In other words, anisotropy or changes in anisotropy can indicate the new fracture volumes. In one or more embodiments, a correlation between before-treatment seismic wave measurements and after-treatment seismic wave measurements may be used to quantify the distribution of fractures (including location, orientation and size) due to the stimulation treatment for a specific formation of interest by analysis of core samples taken before and after the stimulation treatment. That is, a quantified difference in the distribution of fractures from analysis of the before and after-treatment core samples can be used to determine a correlation between quantified differences in seismic wave measurements and the quantified difference in the distribution of fractures. Other methods may also be used to determine a correlation such as mathematical analysis relating to specific rock in a specific formation. In one or more embodiments, a prior-determined correlation may be used for stimulation treatments of the same formation or similar formations.

Figure 2:
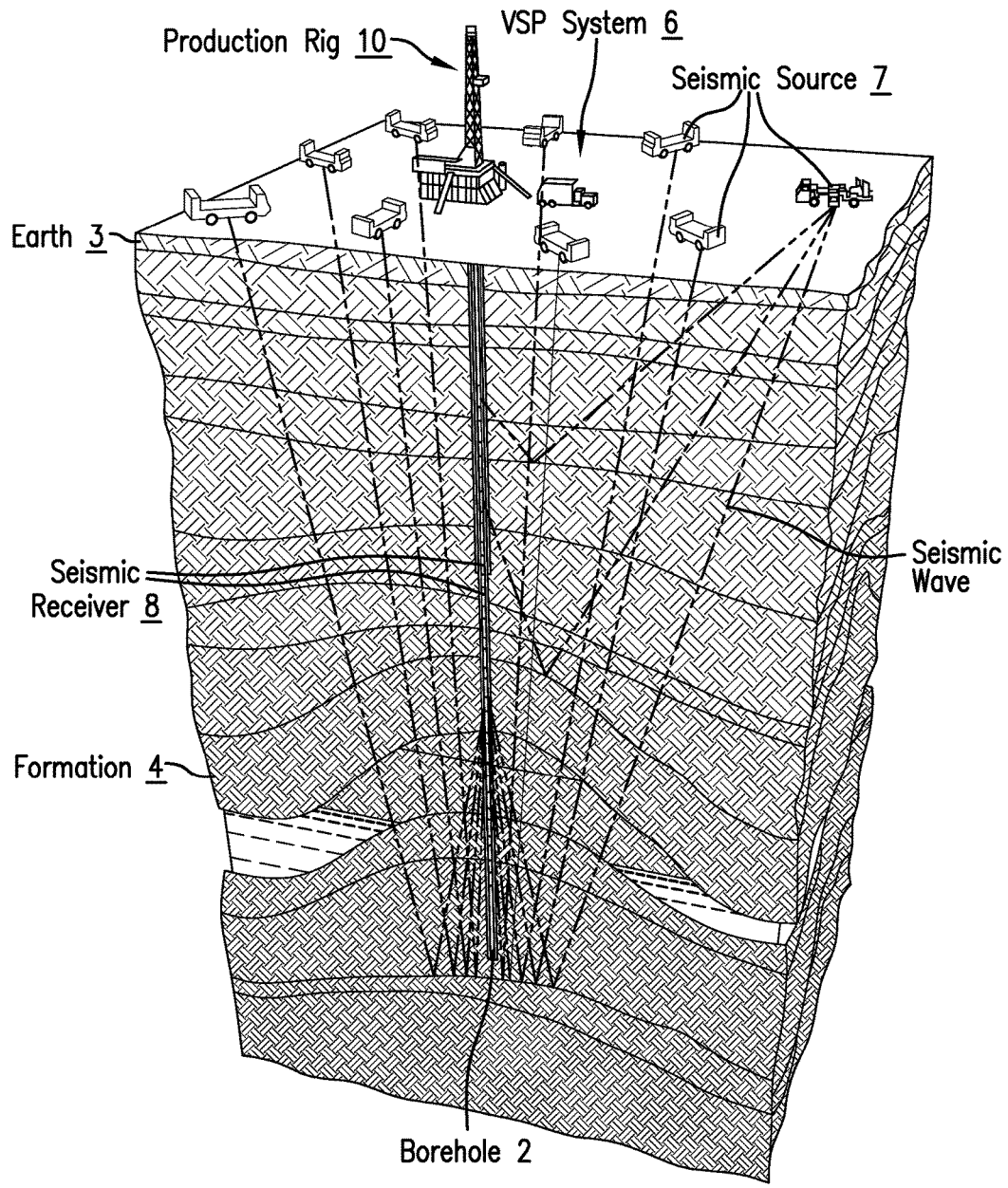
FIG. 2 depicts aspects of the production rig and the VSP system in a three-dimensional view.

FIG. 2 depicts aspects of the production rig 10 and the VSP system 6 in a three-dimensional view. A plurality of formation layers are depicted in embodiment of FIG. 2.

It can be appreciated that various hydrocarbon production actions may be performed upon knowing the fracture density resulting from the stimulation treatment. One action is to generate a map of the fracture density for use by petro-analysts in making production engineering decisions going forward. The map of the fracture density can be used as a metric with respect to a previous estimated fracture density (pre-stimulation treatment) to determine an effectiveness of the stimulation treatment. For example, a stimulation treatment may be determined to not be effective because a change (post versus pre-stimulation treatment) in one or more types of measured values did not exceed a threshold value. Consequently, the petro-analyst or drilling engineer may decide to change a parameter of the stimulation treatment system for the next stimulation treatment to improve its effectiveness. Non-limiting examples of the parameter for hydraulic fracturing include pressure applied at depth of the formation and flow rate. In one or more embodiments, the map may be displayed on a display and/or printed on a printer for use by a user.

In one or more embodiments, the map may be a three-dimensional representation or two-dimensional representation at a virtual planar cut through the formation at a selected location. The map in one or more embodiments may represent each fracture or fracture plane with a line (or plane in three dimensions) having a location and orientation of the line (or plane) that correlates to fracture plane location and orientation and line length (or plane size) that correlates to the size of the fracture plane. The map in one or more embodiments may represent fracture density using colors or shades of colors where each color or shade of color represents a specific fracture density or range of fracture densities.

Another action is to update or verify already-obtained micro-seismic fracture data. This data generally includes fracture sizes, orientations and locations. Micro-seismic fracture data is generally obtained as a hydraulic fracturing process is occurring using microphones or geophones disposed in a borehole penetrating the formation being fractured. The microphones measure the acoustic sounds of rock being fractured. By recording the amplitude and direction of the received sound waves in addition to the time at which the sound waves were received at each microphone, fracture sizes, orientations and locations can be determined using processing techniques such as or similar to triangulation. Sometimes the microphones are located at nodes, which are locations sound waves may cancel each other out so that little or nothing related to sound waves is recorded. In these cases, a correlation may be applied to the one or more quantified differences discussed above to produce equivalent micro-seismic fracture data. In one or more embodiments, the correlation may be determined by analysis or testing in a laboratory or field. This additional micro-seismic data from the correlation application can be incorporated into the micro-seismic fracture data obtained during the fracture process to fill in missing data or correct other data that may be out of place based on known data. Based on the updated the micro-seismic fracture data, another action is to further drill an existing borehole or another borehole (using the production rig 10 for example) into the earth formation in a direction having a vector component perpendicular to a direction of maximum stress in order to decrease the likelihood of the borehole collapsing.

Figure 3:
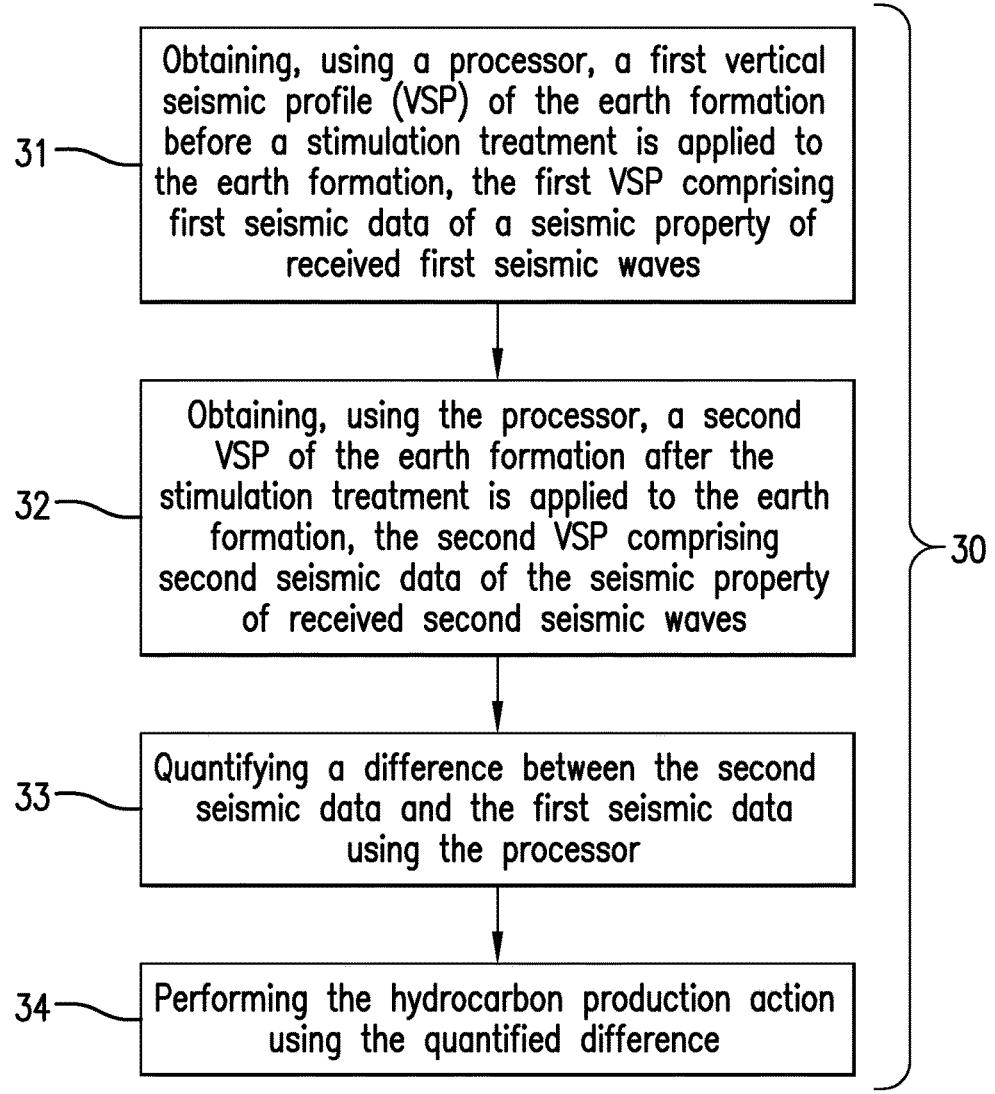
FIG. 3 is a flow chart for a method for performing a hydrocarbon production action on an earth formation.

FIG. 3 is a flow chart for a method 30 for performing a hydrocarbon production action on an earth formation. Block 31 calls for obtaining, using a processor, a first vertical seismic profile (VSP) of the earth formation before a stimulation treatment is applied to the earth formation, the first VSP comprising first seismic data of a seismic property of received first seismic waves. Non-limiting embodiments of the seismic property include seismic wave amplitude, velocity and velocity as a function of location or direction in the earth formation. The stimulation treatment may include hydraulic fracturing using a hydraulic fracturing system. Block 32 calls for obtaining, using the processor, a second VSP of the earth formation after the stimulation treatment is applied to the earth formation, the second VSP comprising second seismic data of the seismic property of received second seismic waves. The first seismic waves and the second seismic waves may have shear (s) waves or primary (p) waves. Block 33 calls for quantifying a difference between the second seismic data and the first seismic data using the processor. Differences in measured velocity as a function of direction can quantify anisotropy of the formation. Block 34 calls for performing the hydrocarbon production action using the quantified difference. In one or more embodiments, the hydrocarbon production action may include constructing a map of fracture density using the processor and/or a printer. Performing the hydrocarbon production action may include estimating micro-seismic fracture sizes, orientations and locations by applying a correlation to the quantified difference to produce micro-seismic fracture data. The method 30 may thus include drilling a borehole in the earth formation in a direction having a vector component perpendicular to a direction of maximum stress using the micro-seismic fracture data in order decrease the likelihood of the borehole collapsing. In addition or alternatively, the hydrocarbon production action may include changing a parameter of the stimulation treatment system when the quantified difference fails to exceed a threshold value and implementing the stimulation treatment system (i.e., stimulating the formation with the changed parameter) using the changed parameter. In one or more embodiments, production parameters may be changed using a signal transmitted from the processor to the production rig controller.

The method 30 may also include performing a first seismic measurement using a VSP system to provide the first VSP. The method 30 may also include generating the first seismic waves using one or more seismic sources and receiving the first seismic waves using an array of seismic receivers disposed in a borehole penetrating the earth formation. The method 30 may also include performing a second seismic measurement after the stimulation treatment using the VSP system to provide the second VSP. The method 30 may also include generating the second seismic waves using the one or more seismic sources and receiving the second seismic waves using the array of seismic receivers disposed in the borehole penetrating the earth formation.

Set forth below are some embodiments of the foregoing disclosure:

Embodiment 1

A method for performing a hydrocarbon production action on an earth formation, the method comprising: obtaining, using a processor, a first vertical seismic profile (VSP) of the earth formation before a stimulation treatment is applied to the earth formation, the first VSP comprising first seismic data of a seismic property of received first seismic waves; obtaining, using the processor, a second VSP of the earth formation after the stimulation treatment is applied to the earth formation, the second VSP comprising second seismic data of the seismic property of received second seismic waves; quantifying a difference between the second seismic data and the first seismic data using the processor; and performing the hydrocarbon production action using the quantified difference.

Embodiment 2

The method according to claim 1, wherein the first seismic waves and the second seismic waves comprise shear (s) waves or primary (p) waves.

Embodiment 3

The method according to claim 1, wherein the seismic property comprises seismic wave amplitude.

Embodiment 4

The method according to claim 1, wherein the seismic property comprises velocity.

Embodiment 5

The method according to claim 3, wherein the seismic property comprises velocity as a function of location in the earth formation and the quantified difference comprises anisotropy of the earth formation.

Embodiment 6

The method according to claim 1, wherein the stimulation treatment comprises hydraulic fracturing using a hydraulic fracturing system.

Embodiment 7

The method according to claim 1, further comprising performing a first seismic measurement using a VSP system to provide the first VSP.

Embodiment 8

The method according to claim 7, further comprising generating the first seismic waves using one or more seismic sources and receiving the first seismic waves using an array of seismic receivers disposed in a borehole penetrating the earth formation.

Embodiment 9

The method according to claim 7 further comprising performing a second seismic measurement after the stimulation treatment using the VSP system to provide the second VSP.

Embodiment 10

The method according to claim 9, further comprising generating the second seismic waves using the one or more seismic sources and receiving the second seismic waves using the array of seismic receivers disposed in the borehole penetrating the earth formation.

Embodiment 11

The method according to claim 1, wherein the hydrocarbon production action comprises constructing a map of fracture density using the processor.

Embodiment 12

The method according to claim 1, wherein the hydrocarbon production action comprises estimating micro-seismic fracture sizes, orientations and locations by applying a correlation to the quantified difference to produce micro-seismic fracture data.

Embodiment 13

The method according to claim 12, further comprising drilling a borehole in the earth formation in a direction having a vector component perpendicular to a direction of maximum stress using the micro-seismic fracture data.

Embodiment 14

The method according to claim 1, further comprising changing a parameter of the stimulation treatment system when the quantified difference fails to exceed a threshold value and implementing the stimulation treatment system using the changed parameter.

Embodiment 15

An apparatus for performing a hydrocarbon production action on an earth formation, the apparatus comprising: a stimulation treatment system; a seismic source configured to emit first seismic waves before a stimulation treatment is applied to the earth formation by the stimulation treatment system and second seismic waves after the stimulation treatment is applied to the earth formation by the stimulation treatment system; an array of seismic receivers configured to receive (i) first seismic waves that provide a first vertical seismic profile (VSP) of the earth formation before the stimulation treatment is applied to the earth formation, the first VSP comprising first seismic data of a seismic property of the received first seismic waves and (ii) second seismic waves that provide a second VSP of the earth formation after the stimulation treatment is applied to the earth formation, the second VSP comprising second seismic data of the seismic property of the received second seismic waves; a processor configured to: obtain the first vertical seismic profile (VSP) of the earth formation before a stimulation treatment is applied to the earth formation; obtain the second VSP of the earth formation after the stimulation treatment is applied to the earth formation; and quantify a difference between the second seismic data and the first seismic data; a hydrocarbon production apparatus configured to perform the hydrocarbon production action using the quantified difference.

Embodiment 16

The apparatus according to claim 15, wherein the hydrocarbon production apparatus comprises a stimulation treatment system.

Embodiment 17

The apparatus according to claim 15, wherein the hydrocarbon production apparatus comprises a production rig configured to further drill an existing borehole or another borehole into the earth formation in a direction having a vector component perpendicular to a direction of maximum stress in order to decrease the likelihood of the borehole collapsing.

In support of the teachings herein, various analysis components may be used, including a digital and/or an analog system. For example, the stimulation treatment system 5, the VSP system 6, the one of more seismic sources 7, the plurality of seismic receivers 8, the computer processing system 9 and the production rig 10 may include digital and/or analog systems. The system may have components such as a processor, storage media, memory, input, output (e.g., a printer or display), communications link (wired, wireless, pulsed mud, optical or other), user interfaces, software programs, signal processors (digital or analog) and other such components (such as resistors, capacitors, inductors and others) to provide for operation and analyses of the apparatus and methods disclosed herein in any of several manners well-appreciated in the art. It is considered that these teachings may be, but need not be, implemented in conjunction with a set of computer executable instructions stored on a non-transitory computer readable medium, including memory (ROMs, RAMs), optical (CD-ROMs), or magnetic (disks, hard drives), or any other type that when executed causes a computer to implement the method of the present invention. These instructions may provide for equipment operation, control, data collection and analysis and other functions deemed relevant by a system designer, owner, user or other such personnel, in addition to the functions described in this disclosure.

Elements of the embodiments have been introduced with either the articles "a" or "an." The articles are intended to mean that there are one or more of the elements. The terms "including" and "having" are intended to be inclusive such that there may be additional elements other than the elements listed. The conjunction "or" when used with a list of at least two terms is intended to mean any term or combination of terms. The term "coupled" relates to a first component being coupled to a second component either directly or indirectly via an intermediary component. The terms "first," "second" and the like do not denote any particular order, but are used to distinguish different elements.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

While one or more embodiments have been shown and described, modifications and substitutions may be made thereto without departing from the spirit and scope of the invention. Accordingly, it is to be understood that the present invention has been described by way of illustrations and not limitation.

It will be recognized that the various components or technologies may provide certain necessary or beneficial functionality or features. Accordingly, these functions and features as may be needed in support of the appended claims and variations thereof, are recognized as being inherently included as a part of the teachings herein and a part of the invention disclosed.

While the invention has been described with reference to exemplary embodiments, it will be understood that various changes may be made and equivalents may be substituted for elements thereof without departing from the scope of the invention. In addition, many modifications will be appreciated to adapt a particular instrument, situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method for performing a hydrocarbon production action on an earth formation, the method comprising:
    obtaining, using a processor, a first vertical seismic profile (VSP) of the earth formation before a stimulation treatment is applied to the earth formation, the first VSP comprising first seismic data of a seismic property of received first seismic waves;
    obtaining, using the processor, a second VSP of the earth formation after the stimulation treatment is applied to the earth formation, the second VSP comprising second seismic data of the seismic property of received second seismic waves;
    quantifying a difference between the second seismic data and the first seismic data using the processor; and
    performing the hydrocarbon production action using the quantified difference, wherein the hydrocarbon production action comprises estimating micro-seismic fracture sizes, orientations and locations by applying a correlation to the quantified difference to produce micro-seismic fracture data; and
    drilling a borehole in the earth formation in a direction having a vector component perpendicular to a direction of maximum stress using the micro-seismic fracture data.

2. The method according to claim 1, wherein the first seismic waves and the second seismic waves comprise shear (s) waves or primary (p) waves.

3. The method according to claim 1, wherein the seismic property comprises seismic wave amplitude.

4. The method according to claim 3, wherein the seismic property comprises velocity as a function of location in the earth formation and the quantified difference comprises anisotropy of the earth formation.

5. The method according to claim 1, wherein the seismic property comprises velocity.

6. The method according to claim 1, wherein the stimulation treatment comprises hydraulic fracturing using a hydraulic fracturing system.

7. The method according to claim 1, further comprising performing a first seismic measurement using a VSP system to provide the first VSP.

8. The method according to claim 7, further comprising generating the first seismic waves using one or more seismic sources and receiving the first seismic waves using an array of seismic receivers disposed in a borehole penetrating the earth formation.

9. The method according to claim 7 further comprising performing a second seismic measurement after the stimulation treatment using the VSP system to provide the second VSP.

10. The method according to claim 9, further comprising generating the second seismic waves using the one or more seismic sources and receiving the second seismic waves using the array of seismic receivers disposed in the borehole penetrating the earth formation.

11. The method according to claim 1, wherein the hydrocarbon production action comprises constructing a map of fracture density using the processor.

12. A method for performing a hydrocarbon production action on an earth formation, the method comprising:
    obtaining, using a processor, a first vertical seismic profile (VSP) of the earth formation before a stimulation treatment is applied to the earth formation, the first VSP comprising first seismic data of a seismic property of received first seismic waves;
    obtaining, using the processor, a second VSP of the earth formation after the stimulation treatment is applied to the earth formation, the second VSP comprising second seismic data of the seismic property of received second seismic waves;
    quantifying a difference between the second seismic data and the first seismic data using the processor; and
    changing a parameter of the stimulation treatment system when the quantified difference fails to exceed a threshold value and implementing the stimulation treatment system using the changed parameter.

13. An apparatus for performing a hydrocarbon production action on an earth formation, the apparatus comprising:
    a stimulation treatment system;
    a seismic source configured to emit first seismic waves before a stimulation treatment is applied to the earth formation by the stimulation treatment system and second seismic waves after the stimulation treatment is applied to the earth formation by the stimulation treatment system;
    an array of seismic receivers configured to receive (i) first seismic waves that provide a first vertical seismic profile (VSP) of the earth formation before the stimulation treatment is applied to the earth formation, the first VSP comprising first seismic data of a seismic property of the received first seismic waves and (ii) second seismic waves that provide a second VSP of the earth formation after the stimulation treatment is applied to the earth formation, the second VSP comprising second seismic data of the seismic property of the received second seismic waves;
    a processor configured to:
        obtain the first vertical seismic profile (VSP) of the earth formation before a stimulation treatment is applied to the earth formation;
        obtain the second VSP of the earth formation after the stimulation treatment is applied to the earth formation; and
        quantify a difference between the second seismic data and the first seismic data;
    a hydrocarbon production apparatus configured to perform the hydrocarbon production action using the quantified difference, wherein the hydrocarbon production apparatus comprises a production rig configured to further drill an existing borehole or another borehole into the earth formation in a direction having a vector component perpendicular to a direction of maximum stress in order to decrease the likelihood of the borehole collapsing.

14. The apparatus according to claim 13, wherein the hydrocarbon production apparatus comprises a stimulation treatment system.

* * * * *